(12) United States Patent
Sorensen

(10) Patent No.: US 8,392,522 B2
(45) Date of Patent: Mar. 5, 2013

(54) BUSINESS INQUIRIES AND OPERATIONS USING MESSAGING SERVICE

(75) Inventor: Carsten Sorensen, Kirke Saaby (DK)

(73) Assignee: Microsoft Corporation, Redmond, WA (US)

( * ) Notice: Subject to any disclaimer, the term of this patent is extended or adjusted under 35 U.S.C. 154(b) by 2210 days.

(21) Appl. No.: 10/696,851

(22) Filed: Oct. 30, 2003

(65) Prior Publication Data

US 2005/0108349 A1 May 19, 2005

(51) Int. Cl.
*G06F 15/16* (2006.01)

(52) U.S. Cl. .................. 709/217; 709/204

(58) Field of Classification Search ............ None
See application file for complete search history.

(56) References Cited

U.S. PATENT DOCUMENTS

| | | | |
|---|---|---|---|
| 6,728,685 B1 * | 4/2004 | Ahluwalia | 705/26 |
| 6,895,388 B1 * | 5/2005 | Smith | 705/26 |
| 6,901,430 B1 * | 5/2005 | Smith | 709/206 |
| 2002/0026373 A1 * | 2/2002 | Kamath et al. | 705/26 |
| 2002/0072980 A1 * | 6/2002 | Dutta | 705/26 |
| 2002/0169710 A1 * | 11/2002 | Morimoto | 705/37 |
| 2002/0174026 A1 * | 11/2002 | Pickover et al. | 705/26 |

OTHER PUBLICATIONS

"How Instant Messaging Works" by Jeff Tyson pp. 1-7, Sep. 19, 2003.

* cited by examiner

*Primary Examiner* — John B. Walsh
(74) *Attorney, Agent, or Firm* — Joseph R. Kelly; Westman, Champlin & Kelly, P.A.

(57) ABSTRACT

The present invention provides a system by which entities interact with one another in a manufacturing channel. The entities (such as a seller and customer) use a messaging system to perform status inquiry and functional processing steps with respect to data stored at the resource management system of the other.

17 Claims, 7 Drawing Sheets

BUSINESS INQUIRIES AND OPERATIONS USING MESSAGING SERVICE

BACKGROUND OF THE INVENTION

The present invention deals with a system and method for facilitating inquires and transactions between businesses or inside a company. In the latter case an employee uses the system for facilitating inquires and transactions. More specifically, the present invention deals with using a messaging service to implement question answering and functional processing between businesses.

The present invention proceeds, for the sake of example, by referring to a manufacturer. However, it will be appreciated that the invention is not so limited and could apply to many other contexts as well, such as within a company, at a distributor, or any other place in a commercial sales channel or supply chain. It could also be used in other business applications, such as finance, customer relation management, etc.

In many business environments, the goal of a manufacturer is to sell to, and to deliver products or services to, retailers (or other customer). In doing so, however, the manufacturer often outsources services to, and orders parts from, external suppliers. The manufacturer may also rely on distributors to distribute its products to retailers.

In one such example, a bicycle manufacturer assembles bicycles for distribution to retailers. In doing so, the bicycle manufacturer orders parts from a number of different suppliers who supply different components of the bicycle, such as frames, wheels, tires, seats, deraileurs, brakes, etc. Each of those suppliers typically ships the parts to the manufacturer through a separate shipping company. The shipping companies used by the different suppliers may, or may not, be the same. Once the manufacturer has obtained all of the parts, and assembles the bicycles, it also typically ships the finished products (the bicycles) to its distributors through a separate shipping company. The distributors, in turn, typically ship the bicycles to the retailers (the eventual customer of the manufacturer) by a separate shipping company. Thus, the goods in this manufacturing chain flow from suppliers, through the manufacturer and distributor, to the retailers. There are at least three shipping links in the manufacturer chain, and thus there may be a wide variety of different shipping companies used. At each step along the chain, delays can occur.

Because all of these companies are conventionally separate companies, it can be very cumbersome and time consuming to track the status of all of the different goods and services provided along the manufacturing chain, and to also track the status of all the varying shipments which are made through separate shipping companies. For instance, if a manufacturer wishes to know the status of an order of bicycle wheels which it has placed with a wheel supplier, the manufacturer must contact the supplier, and either speak with the supplier or leave a message, or send an electronic transmission to the supplier requesting the status of the order. A person at the supplier must then locate the status of the order and return the call or return the electronic transmission. Alternately, some suppliers may provide computer network access to order status information. However, in that instance, the manufacturer must open a network connection to a supplier's network, then choose an appropriate option for viewing order status information, then input an indication of the order (such as the order number) and then allow the supplier's system to transmit the status information corresponding to the order to the manufacturer's computer for display.

Often, the status associated with such an order is simply the ship date which indicates when the order was shipped or when it is planned to be shipped. Therefore, the manufacturer must go through the same process, all over again, with respect to the shipping company that the supplier used to ship the product to the manufacturer. Considering that a manufacturer must repeat this cumbersome process multiple times for a single item that is being supplied by a supplier, and considering the fact that the manufacturer may need to repeat the entire process for a plurality of different items shipped by different suppliers, simply tracking down inventory or other items along the manufacturing chain can be very time consuming and inefficient for a manufacturer.

Similarly, it should be noted that each of the companies in the manufacturing chain may need to track inventory or check on orders. Therefore, the problem exists not only with respect to the manufacturer, but with respect to every member of the manufacturer and distribution chain.

The same problem arises when the manufacturer desires that a functional step be performed on an item of data at a supplier. Assume, for instance, that the manufacturer has requested a price quote from a supplier of bicycle tires. Now assume that the manufacturer wishes to convert the terms of that quote into an actual order for bicycle tires at the supplier. Conventionally, the manufacturer must take very similar steps to checking status of an order. In order words, the manufacturer must somehow contact the supplier, provide the supplier with the quote identifier (such as a quote number) and indicate that the manufacturer wishes to convert that quote into an actual order. The supplier must then update the quote in its resource planning system to indicate that it has now become an actual order, and then provide some type of confirmation to the manufacturer. Of course, this is a cumbersome and time consuming process as well, specifically in light of the fact that it may need to be repeated many times by each individual company or entity in the supply chain.

SUMMARY OF THE INVENTION

The present invention provides a system by which entities interact with one another in a supply chain. The entities (such as a seller and customer) use a messaging system to perform status inquiry and functional processing steps with respect to data stored at the resource management system of the other.

In one embodiment, one of the parties (such as the customer) can enter an item identifier and an indication of an inquiry with respect to the item identified by the item identifier. That information is transmitted through a messaging system to the other party (such as the seller). The seller receives the message, performs database operations to retrieve information responsive to the inquiry, and returns that information via the messaging system.

In one embodiment, the inquiry is simply a status inquiry and the returned information is status information answering the inquiry. In another embodiment, however, the inquiry is a request to perform a substantive data processing step (such as to convert a quote to an order), and the information returned is confirmation that the requested step has been performed.

In yet another embodiment, the returned information is returned through a different communication modality, other than the messaging system. For example, the return information can be returned through electronic mail, facsimile, telephone call, pager information, etc.

DETAILED DESCRIPTION OF ILLUSTRATIVE EMBODIMENTS

The present invention relates to a system by which a seller and customer can exchange information. However, prior to discussing the present invention in greater detail, one illustrative environment in which the present invention can be used is discussed.

Figure 1:
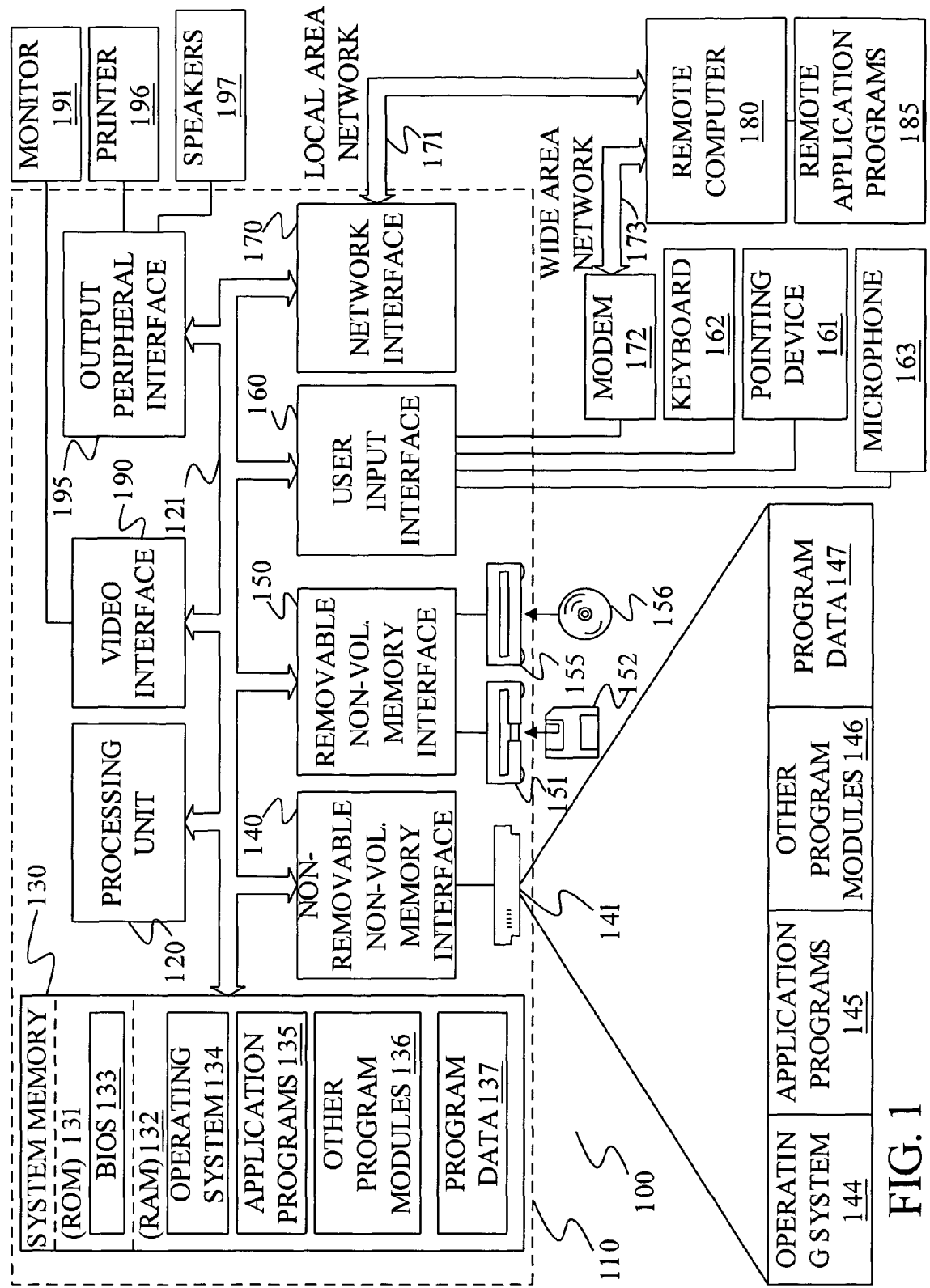
FIG. 1 is one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
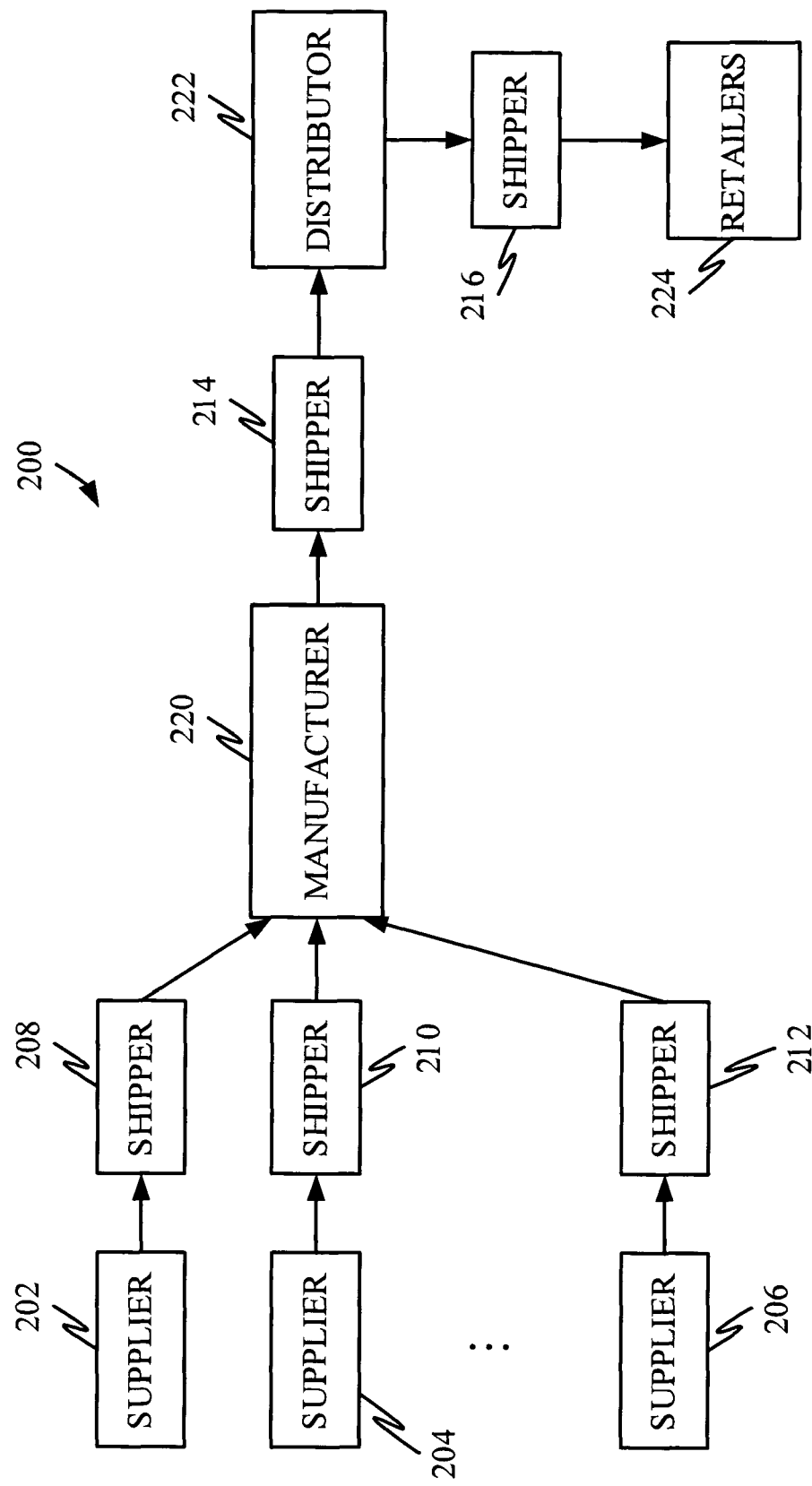
FIG. 2 is a block diagram of a manufacturing channel.

FIG. 2 is a block diagram of one illustrative manufacturing channel 200. Manufacturing channel 200 includes a plurality of suppliers 202, 204 and 206, a plurality of shipping companies 208, 210, 212, 214 and 216, manufacturer 220, distributor 222 and retailer 224. The present invention will be described with respect to the channel 200 shown in FIG. 2, and with respect to manufacturer 220 being a bicycle manufacturer that sells bicycles through distributors 222 to retailers 224. It will, of course, be appreciated that the scenario discussed is exemplary only and is used for describing features of the present invention. The invention is not limited to the scenario discussed. For example, the manufacturer could be any type of manufacturer, it could be supplied with goods and/or services, and it could sell to end user customers or retailers, with or without a distributor, as examples. Similarly, the present invention can be used by any business using business applications, such as in finance, customer relations management, etc.

In any case, manufacturer 220 is illustratively a bicycle manufacturer who receives parts from suppliers 202, 204 and 206 and assembles those parts into finished bicycles. Each of suppliers 204-206 ship the parts to manufacturer 220 using shipping companies (or shippers) 208, 210 and 212, respectively. It will, of course, be noted that the shippers 208-212 can be different companies or the same company.

Once manufacturer 220 manufactures (e.g., assembles) the bicycles, it ships the bicycles to distributor 222 using yet another shipper 214. Distributor 222, in turn, ships the bicycles received from manufacturer 220 to the plurality of retailers 224 who eventually sells the bicycles to the end customer. In sending the bicycles, distributor 222 uses yet another shipper 216.

As described in the background section, the suppliers, shippers, manufacturer, distributor and retailers are illustratively separate companies, and in many cases have barriers between them. For instance, it is not unusual for each of the companies to have separate computer systems which do not communicate with one another directly. As discussed in the background section, this can cause a great deal of difficulty in attempting to do even simple tasks, such as obtaining the status of an order or converting a quote to an actual order.

Figure 3:
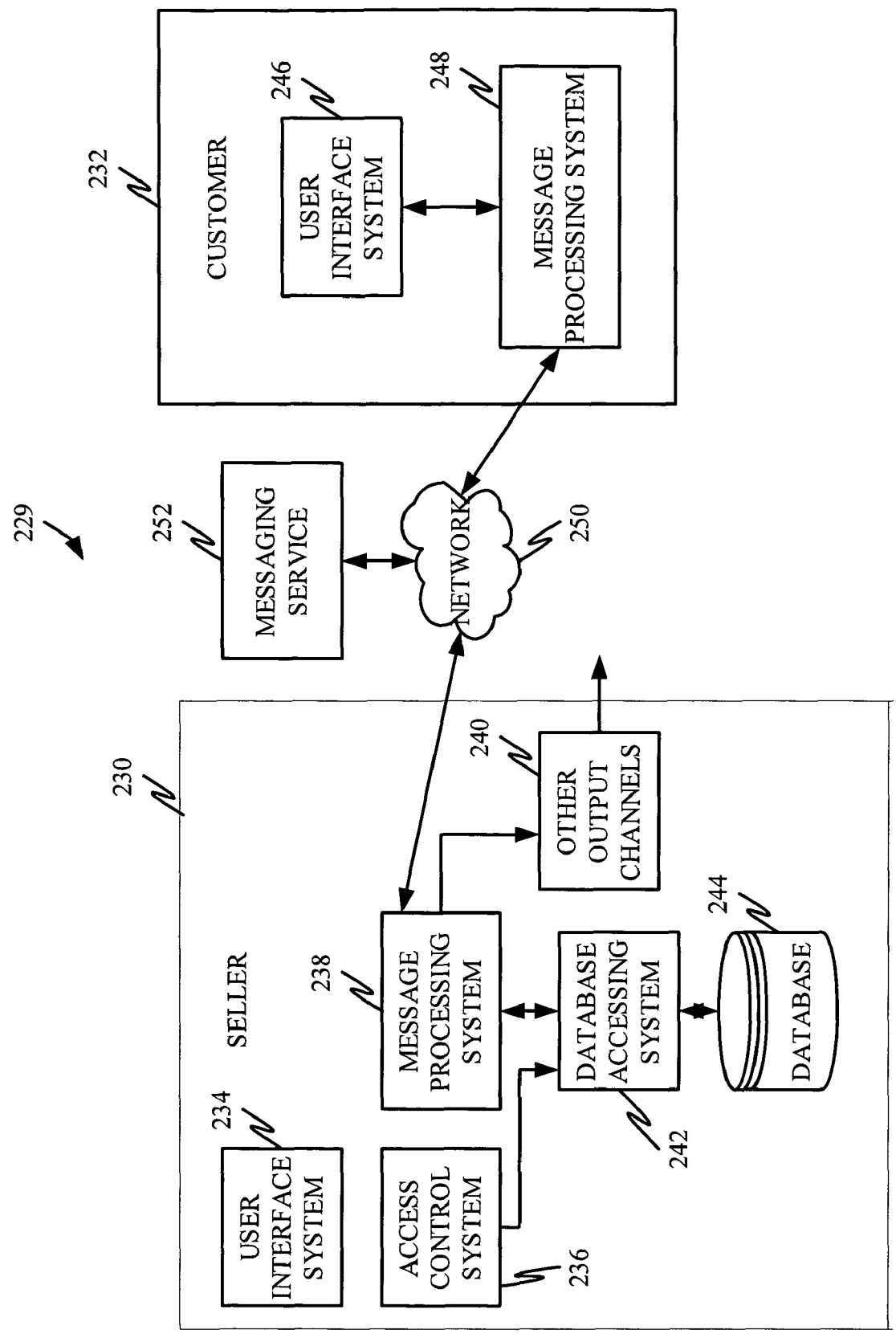
FIG. 3 is a more detailed block diagram of a seller and customer from a manufacturing channel in accordance with one embodiment of the present invention.

FIG. 3 illustrates a more detailed block diagram of a system 229 with seller 230 and customer 232. It should be noted that, for the sake of the present description, the seller can be any one of the entities in channel 200 shown in FIG. 2 which sells something (e.g., the manufacturer), and customer 232 can be any of those entities which purchases something from a seller (e.g., a distributor or retailer). For the sake of generality, the items in FIG. 3 have been referred to as seller 230 and customer 232.

FIG. 3 shows that seller 230 includes a user interface system 234, an access control system 236, message processing system 238, output channels 240, database accessing system 242 and database 244. User interface system 234 is, in one illustrative embodiment, a general user interface system that allows a user to access other components within seller 230.

Message processing system 238, as is described below, generates instant messages for transmission to customer 232 based on inputs from user interface system 234. Message processing system 238 also receives messages from customer 232 and processes those messages to determine what type of response is desired. Message processing system 238 controls database accessing system 242 to retrieve the desired information from database 244 so that the information can be formatted into a proper instant messaging format and transmitted back to customer 232.

Output channels 240 are alternative output channels, such as an electronic mail channel, a paging channel, a cellular telephone channel, etc. As is described below, message processing system 238 may provide a response through an alternate channel 240, other than the instant messaging channel.

Database accessing system 242 and database 244 may illustratively embody a resource planning system which is used for planning and managing the resources of seller 230 in filling orders to customers (such as customer 232). In that embodiment, database 244 contains a wide variety of records related to the resources of seller 230. Those records may identify and describe, for instance, inventory currently held by seller 230. The records may also describe orders which have been received and which are being processed. Further, database 244 may include records describing customers of seller 230, and pricing information related to orders being filled for those customers. Database 244 may also illustratively include records that describe quotes which have been made to customers for various products sold by seller 230. The quotes may illustratively include the cost and delivery terms associated with a predefined product which is being quoted. Of course, database 244 can store a wide variety of additional or different information related to its business.

Database 244 and database accessing system 242 can be configured as a relational database and a corresponding accessing system. For instance, they may implement a structured query language (SQL) database and database accessing system. Alternatively, database 244 and system 242 can be used to implement an object relational database. In that embodiment, database 244 may be implemented using an SQL database system, but database accessing system 244 may allow users to access the data stored in database 244 in terms of objects. Thus, database accessing system 242 receives queries to database 244 in terms of objects, and converts those queries into relational database queries and executes the relational database queries against database 244. Database accessing system 242 then returns the results received from database 244, formatted in terms of objects instead of tables.

While database accessing system 242 and database 244 have been described by way of multiple examples, it will be appreciated that they can be implemented in other ways as well (such as for example, using web services), and those discussed are mentioned for the sake of example only. FIG. 3 shows that customer 232 includes user interface system 246 and message processing system 248. Message processing system 248 is similar to message processing system 238 in that it receives inputs from the user through user interface system 246 and generates and transmits instant messages based on those inputs.

In one illustrative embodiment, message processing systems 238 and 248 are connected to one another via network 250 and instant messaging service 252. In one embodiment, network 250 is a wide area network (or a global network such as the Internet) but it can be another network as well. Messaging service 252 is also shown connected through network 250 to message processing systems 238 and 240. In one embodiment, messaging service 252 provides a messaging service which effectively connects processing systems 238 and 248 so that they can send messages back and forth very quickly, without numerous operations being performed by the user. One embodiment of messaging service 252 and message processing systems 238 and 248 is the system sold under the designation MSN MESSENGER by Microsoft Corporation of Redmond, Wash. Of course, a wide variety of other similar types of instant messaging services 252 can be used as well. Some such systems include those sold under the designations YAHOO!MESSENGER by Yahoo! Inc., and AOL Instant Messenger (or AIM) by America Online, Inc.

Access control system 236 allows the seller 230 to control access to its database 244. Through the user interface system 234, the user can authorize customers to have access to all, or limited portions of, database 244. Of course, if desired, the user can remove authorization as well so the seller has no access to any part of database 214.

Figure 4:
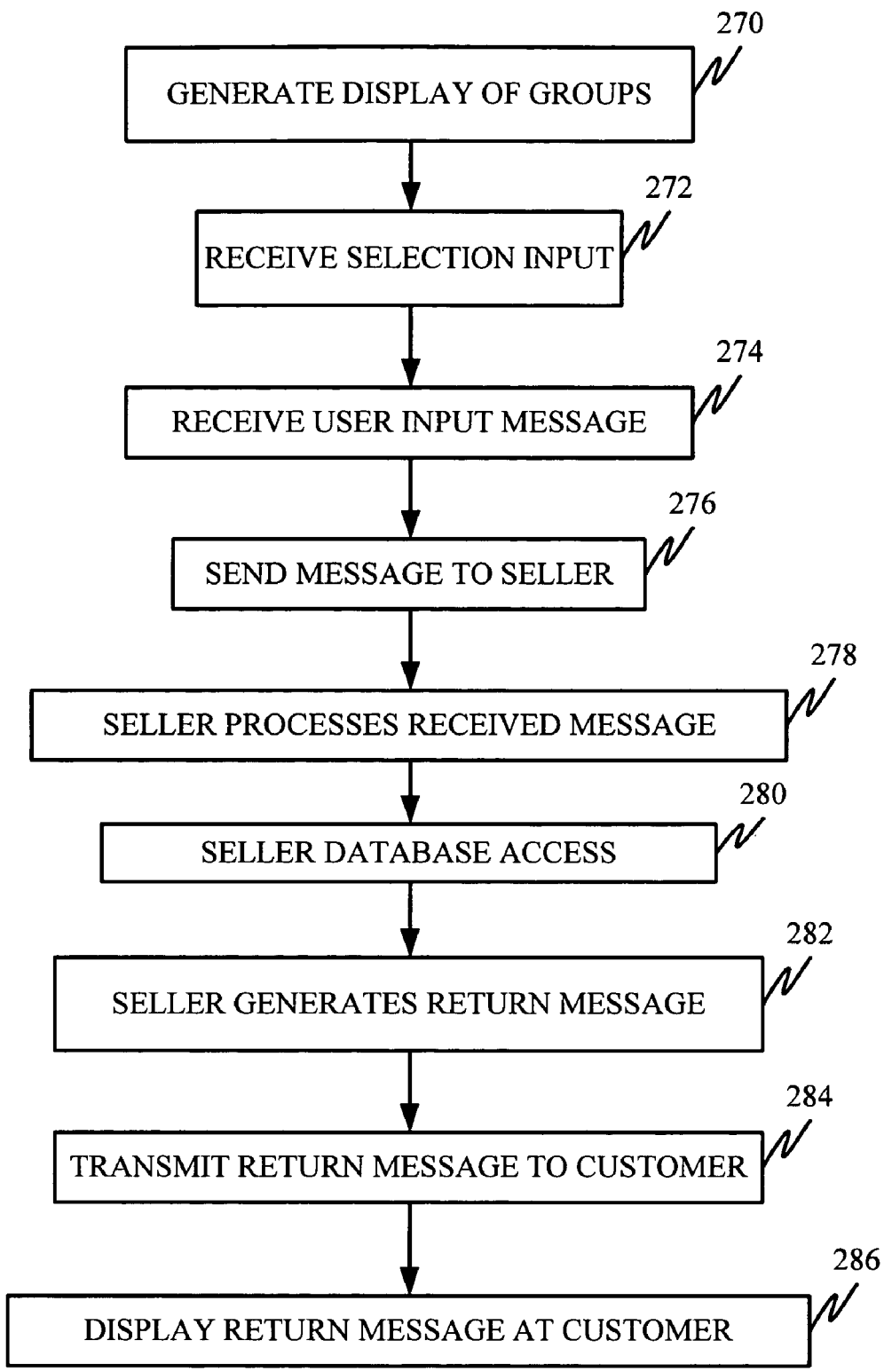
FIG. 4 is a flow diagram illustrating how the system shown in FIG. 3 operates in accordance with one embodiment of the present invention.

FIG. 4 is a flow diagram illustrating the operation of the system 229 shown in FIG. 3 in accordance with one embodiment of the present invention. FIGS. 5A-5G are user interface displays which help to illustrate the operation of system 229 in accordance with one embodiment of the present invention. Briefly, as is described below with respect to FIGS. 3-5G, message processing systems 238 and 248 can be used such that customer 232 can query the status of various items in database 244 and receive a response from message processing system 238, without undergoing the cumbersome and time consuming processes required by prior systems. Similarly, in accordance with another embodiment of the invention, and as is described below, customer 232 can actually undertake functional data manipulation steps on data in database 244, through message processing system 238, again without undergoing the time consuming and cumbersome processes required by prior systems.

In one illustrative embodiment, customer 232 has configured message processing system 248 (such as through the use of messaging service 252) such that it has a hierarchically organized group corresponding to seller 230. In that case, when the user accesses message processing system 248 through user interface system 246, system 248 generates a display through user interface system 246 such as display 260 shown in FIG. 5A. Display 250 shows that the customer 232 has set up a group corresponding to seller 230 where a plurality of messaging features are available for that seller. Those features include inventory feature 262, order status feature 264 and quote-to-order feature 266, by way of example.

Therefore, when the user wishes to invoke any of features 262-266, the user first brings up the display 260 through user interface 246 from message processing system 248. This is indicated by block 270 in FIG. 4. Next, message processing system 248 receives a selection input from the user. This is indicated by block 272.

For instance, the user may use any desired user input device (such as push buttons, a stylus, a touch sensitive screen, a keypad, etc.) to select the desired feature for use. Assume that the user highlights or otherwise selects the inventory feature 262. This causes message processing system 248 to generate a display, such as display 262 shown in FIG. 5B, except that the message area 264 is blank. Display 262 shows that the user has accessed the inventory feature and wishes to use that feature by entering text into message area 264. The user then enters into message area 264 an inventory item number through user interface system 246. Receiving the user input message is indicated by block 274 in FIG. 4.

Figure 5A:
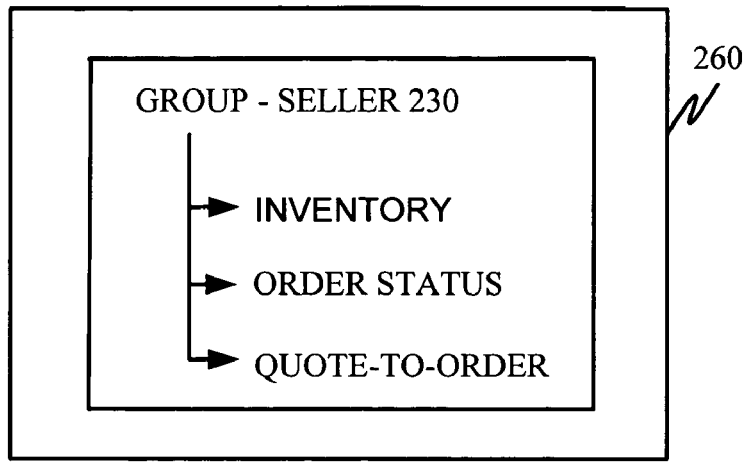
FIGS. 5A-5G illustrate exemplary user interface displays to further illustrate the operation of the system shown in FIG. 3.
Figure 5B:
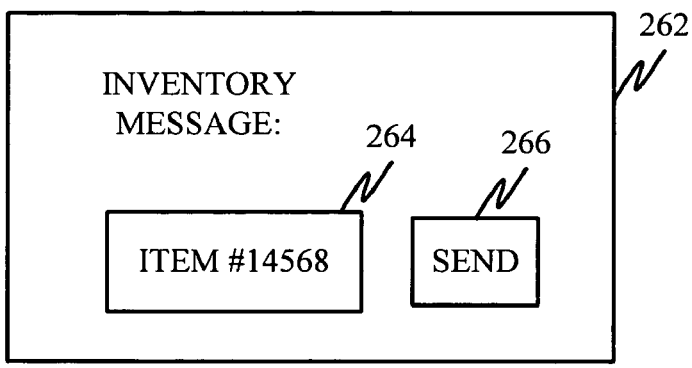

The message shown in FIG. 5B is that the user has entered item number 14568 under the inventory feature in the group corresponding to seller 230. Message processing system 248 formats this input into an instant message which can be processed by messaging service 252 and sent to message processing system 238.

The user then provides a "send" input indicating that user wishes to send the message. In one embodiment, this is accomplished by simply selecting the send button 266 shown in FIG. 5B (which can again be selected through a stylus, by depressing a button on a keypad, by touching the "send" button 266 on a touch sensitive screen, etc.). Message processing system 248 then sends the message to seller 230. This is indicated by block 276 in FIG. 4. Again, it will be noted that the messaging system used to transmit the message from customer 232 to seller 230 may illustratively be any type of instant messaging system by which the message can be sent directly to seller 230 through network 250 and message service 252, without various intermediate sending steps required by the user, such as is encountered with electronic mail.

In any case, once message processing system 238 receives the message, it recognizes that it is identifying an inventory item and generates a request to database accessing system 242 to retrieve information related to inventory item 14568 from database 244. Processing the message is indicated by block 278 in FIG. 4.

In response to the request from message processing system 238, database accessing system 242 generates a database query and executes it against database 244. The query retrieves the information in database 244 corresponding to inventory item 14568. This is indicated by block 280 in FIG. 4. The information returned from database 244 is returned by database accessing system 242 to message processing system 238, in a desired format. Message processing system 238 then generates a message containing the information responsive to the inquiry received from customer 232 and returns that message to message processing system 248. Generation of the message is indicated by block 282 in FIG. 4 and transmission of the message to customer 248 is indicated by block 284 in FIG. 4.

Figure 5C:
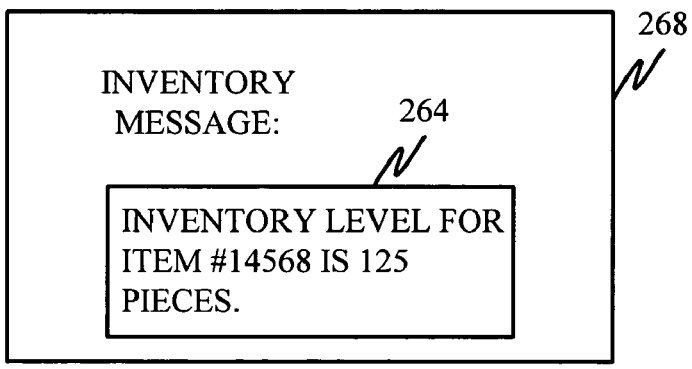
Figure 5D:
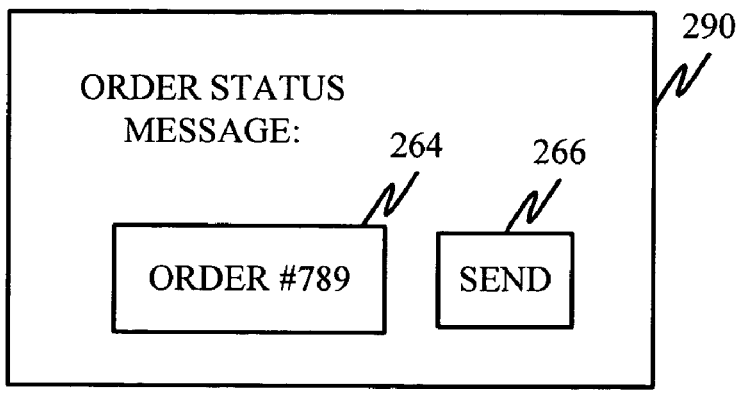

Message processing system 248 then accesses user interface system 246 and displays the return message to the user. One exemplary display is that shown at 268 in FIG. 5C. FIG. 5C shows that the message field 264 contains a message "Inventory level for item #14568 is 125 pieces". Displaying the return message at customer 232 is indicated by block 286 in FIG. 4.

It can thus be seen that customer 232 has generated a request for data in database 244 at seller 230 very quickly and easily, by simply opening up the message interface to message processing system 248. The user then simply enters the simplified query and hits send and the message is fully processed. Data is retrieved from database 244, and a return message is received without the user being required to take anymore steps. This is highly advantageous over prior systems which, at the very least, required a user to establish a connection with a web site representing the seller, open up multiple web pages allowing the user to search on a particular item, then enter the item number and execute the search. Many prior systems were even much more complex than that.

It should also be noted that, while the present invention has been described with respect to simply querying the inventory level of seller 230 using instant messaging, it can be used to accomplish a wide variety of other tasks as well. For example, if the customer 232 wishes to check the status of an order it has placed with seller 230, the user simply highlights the "Order Status" feature 264 shown in FIG. 5A and message processing system 248 generates a display, such as display 290 shown in FIG. 5D without any text in message box 264. The display indicates that the user has selected the Order Status feature and allows the user to input an order number. In the embodiment shown, the user has entered order #789 into message portion 264. The user then hits Send at send button 266 and message processing system 248 formulates the message and sends it to message processing system 238 which causes a database query to be executed against database 244 to return order information corresponding to order #789.

Figure 5E:
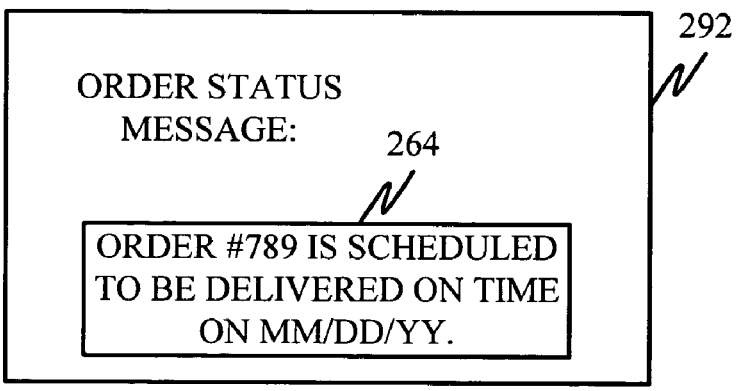

When the information is retrieved, message processing system 238 formats it as an instant message and sends it to message processing system 248 where it is displayed through user interface system 246 to the user in the form such as the display shown at 292 in FIG. 5E. Display 292 shows that message area 264 now contains the message "Order #789 is scheduled to be delivered, on time, on mm/dd/yy.", wherein the date portion would, of course, contain the estimated delivery date for the order. Again, the user has been able to obtain the order status by simply sending a message with the order number through an instant messaging service. The user very quickly receives the return message indicating the order status. This is all done with very few manual steps required.

In accordance with another embodiment of the present invention, the customer can perform functional data manipulation steps on data in database 244 as well. For instance, if the user selects the Quote-to-Order feature 266 shown in FIG. 5A, message processing system 248 illustratively generates a display such as display 294 shown in FIG. 2F, without any text entered in message area 264. This allows the user to insert a quote number and convert that quote to an actual order at seller 230.

Figure 5F:
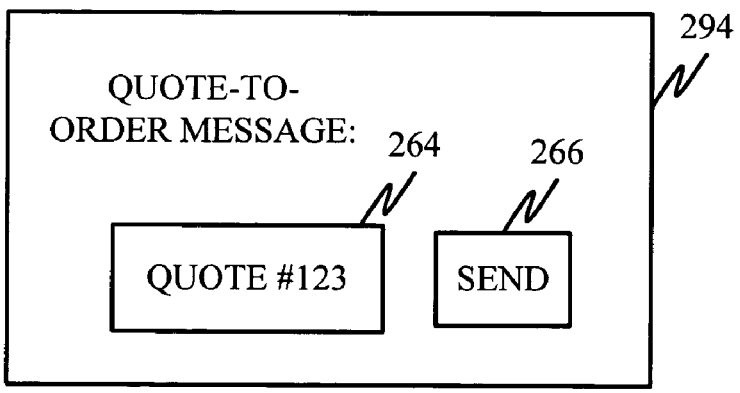

For instance, FIG. 5F shows that the user has simply entered in quote #123. The user then simply actuates the send button 266 and the message is sent from message processing system 248 to message processing system 238. Message processing system 238 causes an update to be performed on database 244. The update converts quote #123 contained in database 244 into an actual order. When this is complete, message processing system 238 sends a confirmation message back to message processing system 248 for display to the user. One embodiment of such a confirmation message is shown at 296 in FIG. 5G.

Figure 5G:
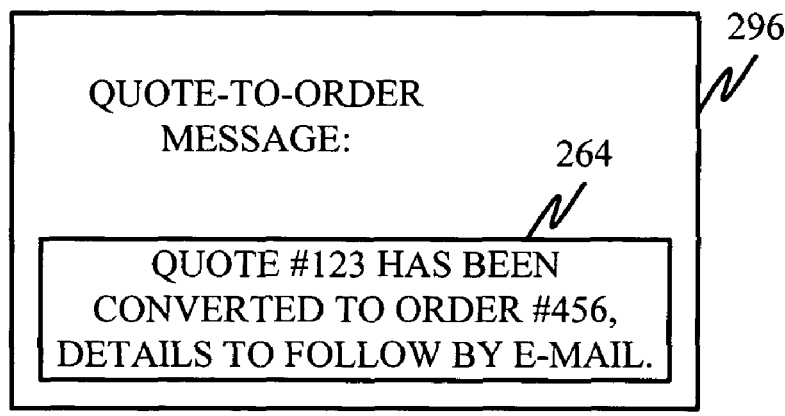

FIG. 5G shows that message area 264 contains the message "Quote #123 has been converted to order #456, details to follow by email." Of course, all of the details of the new order #456 could also be sent through the messaging system. However, FIG. 5G illustrates another embodiment of the invention in which message processing system 238 utilizes multiple channels to respond to an inquiry by message processing system 248.

In the embodiment illustrated, the details regarding order #456 may be relatively voluminous so that they are better able to be displayed in electronic mail format. Therefore, message processing system 238 sends a relatively short message to message processing system 248 confirming that the desired functional data manipulation step has been performed, and also indicating the communication modality which will be used to transmit the remaining information. Message processing system 238 then invokes one of the other output channels 240 (in this case the electronic mail output channel) and sends the detailed information corresponding to the new order #456 (such as the delivery date, the price, other delivery terms, etc.) to customer 232 using electronic mail.

The present invention thus allows a customer to query information at a seller with a very few number of user input steps required. Another embodiment of the present system allows the customer to perform actual functional data manipulation steps on data in the database of the seller, again with very few manual steps required. This substantially improves the efficiency and ease with which these types of communications can be made, rendering the present system significantly advantageous over prior systems used to accomplish this type of communication.

Also, the context used to describe the invention is exemplary only. The invention could as easily be used within a company, and using wireless or other communication technologies. For instance, prior to making a sales call, a sales person can use the invention to query a customer's credit limits using a cellular phone or other handheld device.

Although the present invention has been described with reference to particular embodiments, workers skilled in the art will recognize that changes may be made in form and detail without departing from the spirit and scope of the invention.

What is claimed is:
1. A system for communicating with a remote business, comprising:
   an instant message processing system sending its connection information to an instant messaging server and receiving connection information for the remote business from the instant messaging server, the instant mes- sage processing system generating a user interface display that receives user selection inputs and displays a group indicator in an instant messaging application, the group indicator identifying the remote business and displaying a plurality of selectable features corresponding to the remote business, the user interface display receiving a user feature selection input indicative of a selected quote-to-order feature corresponding to a business information request to convert a quote to an order, and receiving a textual input identifying the quote that is a subject of the business information request; and the instant message processing system generating the business information request as an instant message, and transmitting the instant message to the remote business directly, using the connection information for the remote business received from the instant messaging server and without further utilizing the instant messaging server to transmit the instant message to the remote business, the instant message processing system receiving an instant message responsive to the business information requested directly from the remote business without the responsive instant message passing through the instant messaging server, and displaying the responsive instant message.

2. The system of claim 1 wherein the instant message processing system displays one of the plurality of features on a user interface component as a business transaction status inquiry.

3. The system of claim 1 wherein the instant message processing system includes a user interface component to display one of the plurality of features as a data manipulation feature for manipulating business data at the remote business.

4. The system of claim 1 wherein the instant message processing system is configured to receive a response instant message from the remote business, responsive to the business information request.

5. The system of claim 4 wherein the instant message processing system includes a user interface component to display the responsive instant message as confirmation that the quote was converted to an order.

6. The system of claim 1 wherein the instant message processing system includes a user interface component to display one of the plurality of features as an order status update feature.

7. The system of claim 6 wherein the order status update feature, when selected, generates the business information request to perform an order status update operation on an identified order.

8. The system of claim 7 wherein the instant message processing system receives an order identifier, identifying the identified order, through the display.

9. The system of claim 1 wherein the instant message processing system includes a user interface component to display one of the plurality of features as an inventory request.

10. A computer-implemented method, comprising:
using an instant message processing system to send its connection information to an instant messaging server and receive connection information for a remote business from the instant messaging server, the instant message processing system generating a user interface display that receives user selection inputs and displays a group indicator in an instant messaging application, the group indicator identifying the remote business and displaying a plurality of selectable features corresponding to the remote business, the user interface display receiving a user feature selection input indicative of a selected quote-to-order feature corresponding to a business information request to convert a quote to an order, and receiving a textual input identifying the quote that is a subject of the business information request; and using the instant message processing system to generate the business information request as an instant message, and transmit the instant message to the remote business directly, using the connection information for the remote business received from the instant messaging server and without further utilizing the instant messaging server to transmit the instant message to the remote business, the instant message processing system receiving an instant message responsive to the business information requested directly from the remote business without the responsive instant message passing through the instant messaging server, and displaying the responsive instant message.

11. The computer-implemented method of claim 10 wherein displaying the plurality of selectable features comprises:
displaying one of the plurality of features as a business transaction status inquiry.

12. The computer-implemented method of claim 10 wherein displaying the plurality of selectable features comprises:
displaying one of the plurality of features as a data manipulation feature for manipulating business data at the remote business.

13. The computer-implemented method of claim 10 wherein displaying the responsive instant message comprises:
display the response instant message as confirmation that the quote was converted to an order.

14. A hardware computer readable storage medium storing computer readable instructions which, when executed by a computer, cause the computer to perform a method comprising:
using an instant message processing system to send its connection information to an instant messaging server and receive connection information for a remote business from the instant messaging server, the instant message processing system generating a user interface display that receives user selection inputs and displays a group indicator in an instant messaging application, the group indicator identifying the remote business and displaying a plurality of selectable features corresponding to the remote business, the user interface display receiving a user feature selection input indicative of a selected quote-to-order feature corresponding to a business information request to convert a quote to an order, and receiving a textual input identifying the quote that is a subject of the business information request; and using the instant message processing system to generate the business information request as an instant message, and transmit the instant message to the remote business directly, using the connection information for the remote business received from the instant messaging server and without further utilizing the instant messaging server to transmit the instant message to the remote business, the instant message processing system receiving an instant message responsive to the business information requested directly from the remote business without the responsive instant message passing through the instant messaging server, and displaying the responsive instant message.

15. The hardware computer readable storage medium of claim 14 wherein displaying the plurality of selectable features comprises:
  displaying one of the plurality of features as a business transaction status inquiry.

16. The hardware computer readable storage medium of claim 14 wherein displaying the plurality of selectable features comprises:
  displaying one of the plurality of features as a data manipulation feature for manipulating business data at the remote business.

17. The hardware computer readable storage medium of claim 14 wherein displaying the responsive instant message comprises:
  displaying the responsive instant message as confirmation that the quote was converted to an order.

* * * * *